United States Patent [19]

Horie

[11] Patent Number: 5,355,632
[45] Date of Patent: Oct. 18, 1994

[54] APPARATUS FOR TEXTURE PROCESSING OF MAGNETIC DISK

[75] Inventor: Yuji Horie, Tokyo, Japan

[73] Assignee: Nihon Micro Coating Co., Ltd., Tokyo, Japan

[21] Appl. No.: 974,807

[22] Filed: Nov. 12, 1992

[30] Foreign Application Priority Data

Nov. 13, 1991 [JP] Japan .................... 3-323965

[51] Int. Cl.$^5$ ............................. B24B 49/00
[52] U.S. Cl. ..................... 451/165 R; 451/8; 451/6
[58] Field of Search ............ 51/165 R:165.71, 165.74, 51/165.75, 165.76, 165.72; 364/474.02, 474.06, 551.02

[56] References Cited

U.S. PATENT DOCUMENTS

| | | | |
|---|---|---|---|
| 4,501,095 | 2/1985 | Drinkuth et al. | 51/165.72 |
| 4,566,225 | 1/1986 | Bizot et al. | 51/165.72 |
| 4,766,700 | 8/1988 | Kramberg et al. | 51/165.72 |
| 5,088,240 | 2/1992 | Roble et al. | 51/281 SF |
| 5,136,819 | 8/1992 | Takagi et al. | 51/281 SF |

FOREIGN PATENT DOCUMENTS 0232937  9/1988  Japan ................ 51/281 SF

Primary Examiner—M. Rachuba
Attorney, Agent, or Firm—Heller, Ehrman, White & McAuliffe

[57] ABSTRACT

The object of this invention is, in magnetic disk surface texture processing by abrasive tape, to achieve uniformity of roughness of the processed surface by automatically adjusting the feed speed of the abrasive tape, and to increase productivity. It consists of a sensor unit that measures the processing state of the surface of a magnetic disk on which texture processing has been completed, a holding unit for rotating the magnetic disk during measurement, and a processing equipment that compares the measured values with predetermined processing conditions and again corrects the processing conditions when they depart from the set conditions, and it maintains stable processing accuracy.

2 Claims, 4 Drawing Sheets

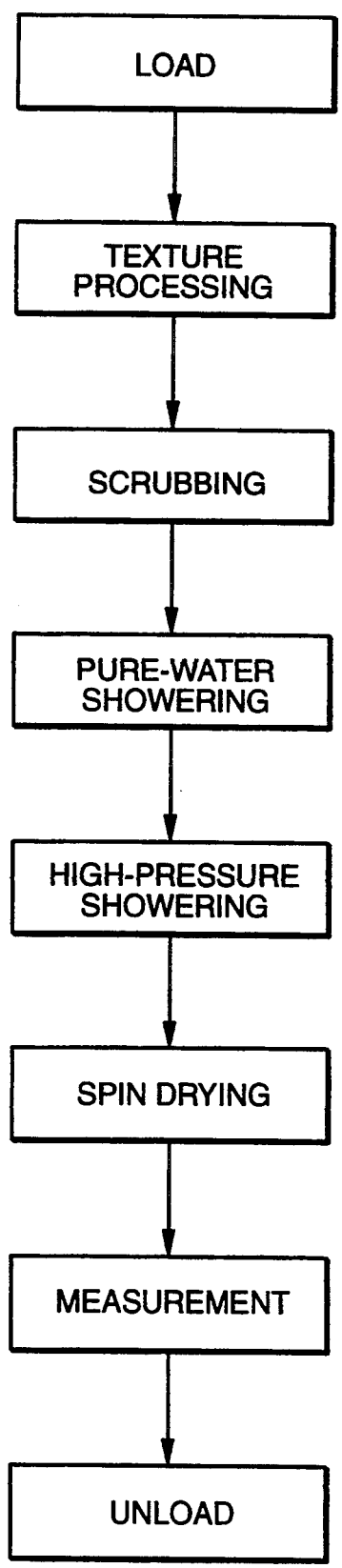
FIG._1

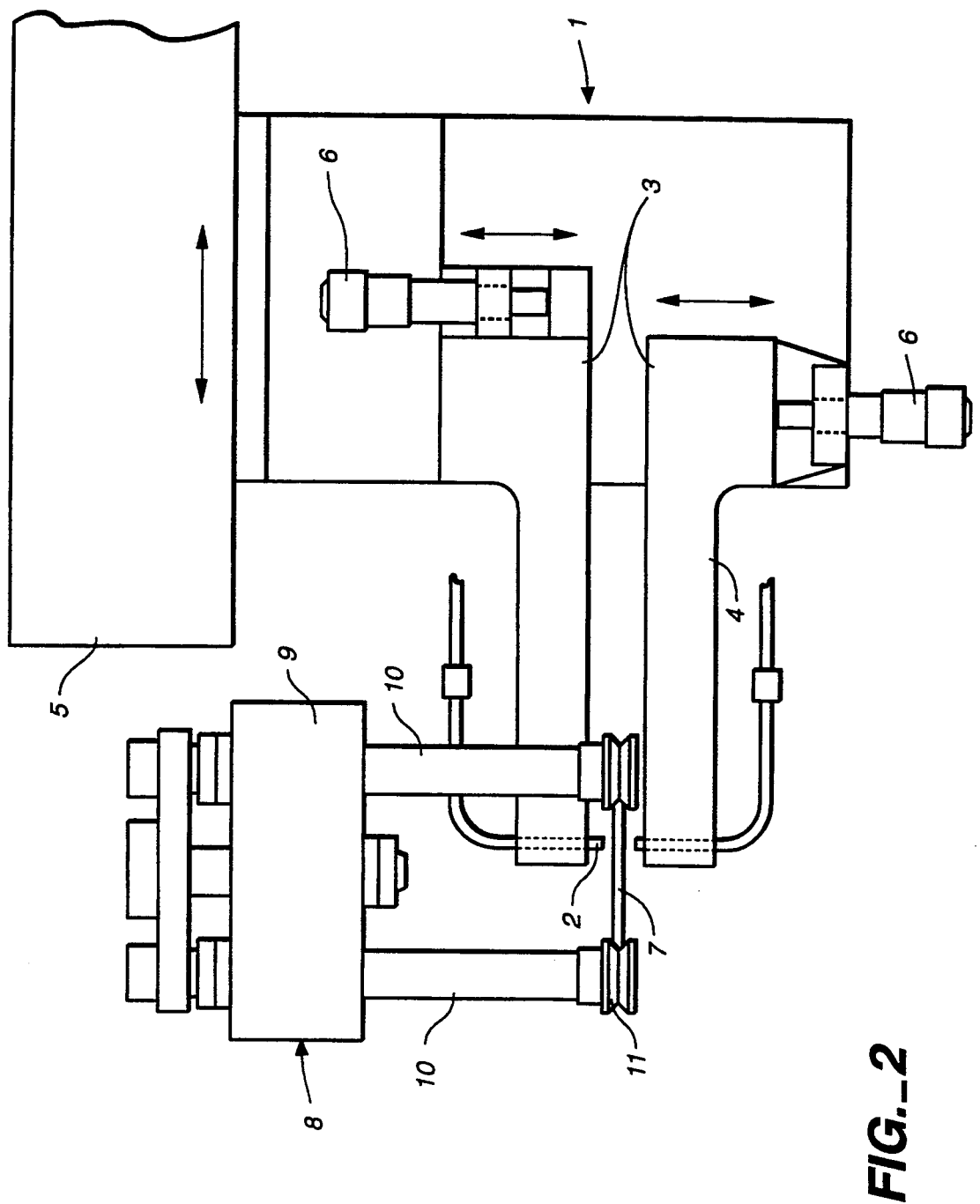
FIG._2

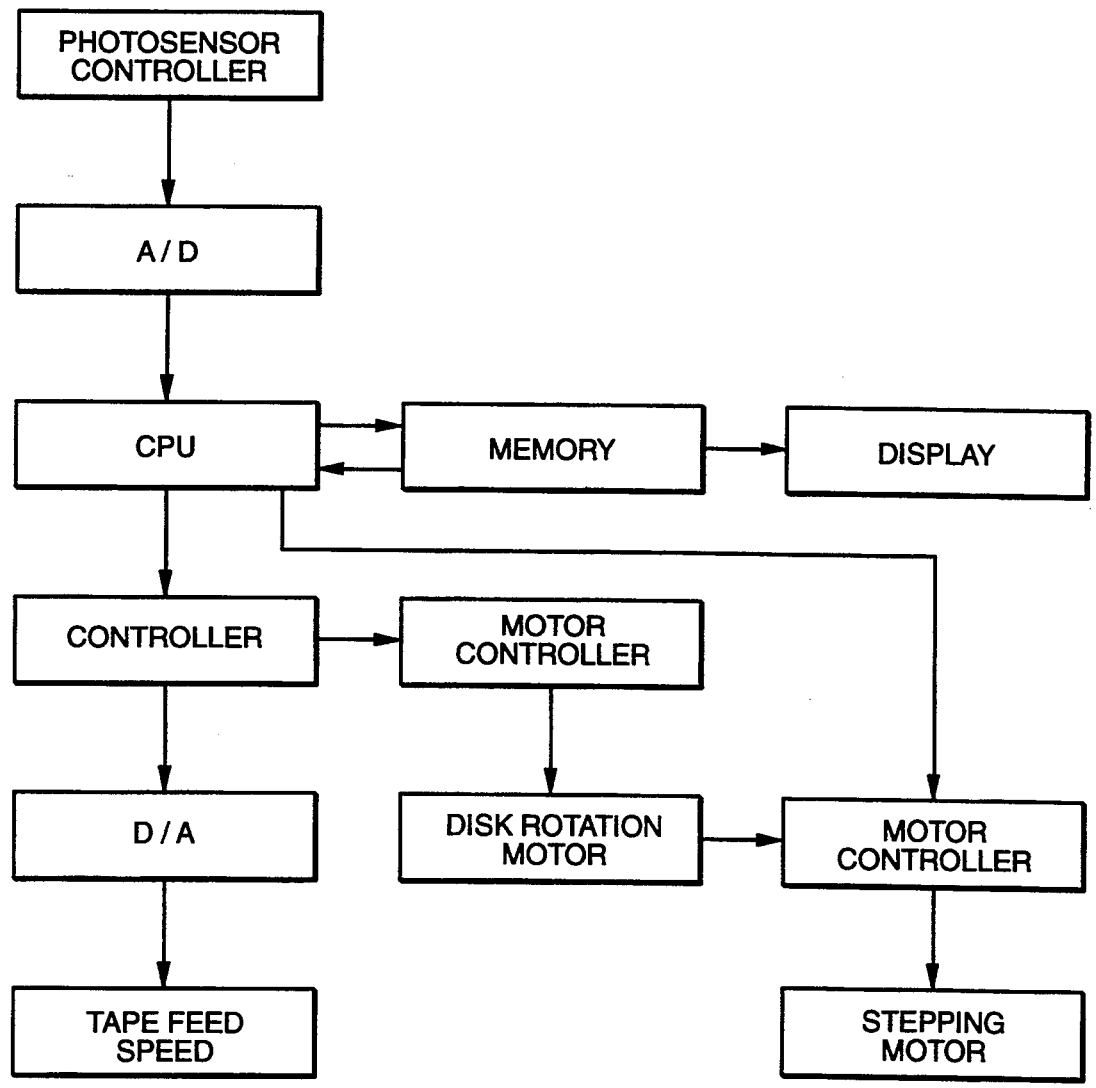
FIG._3

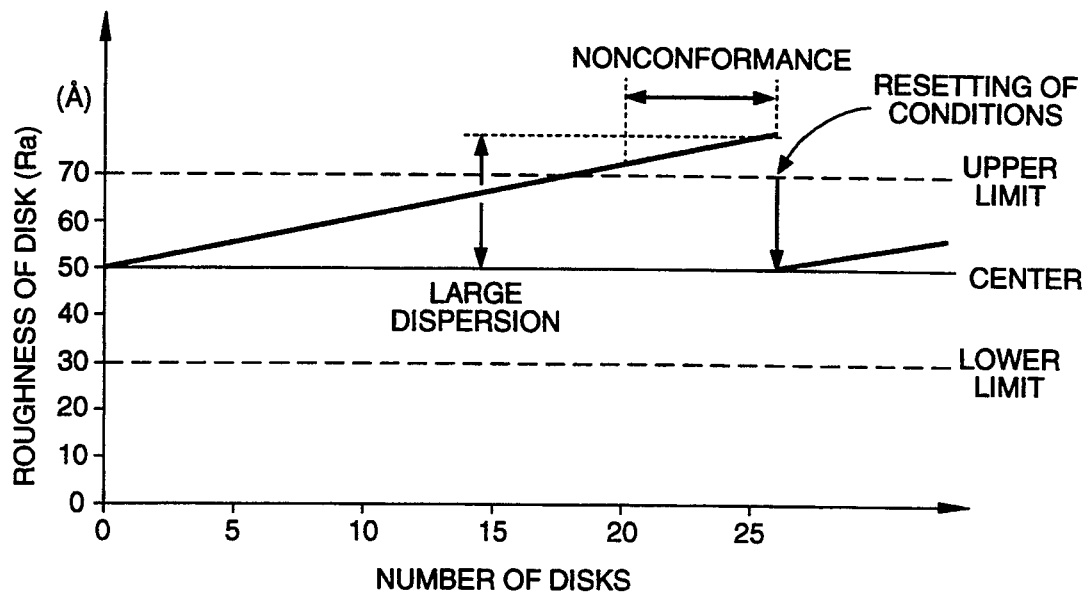
FIG._4
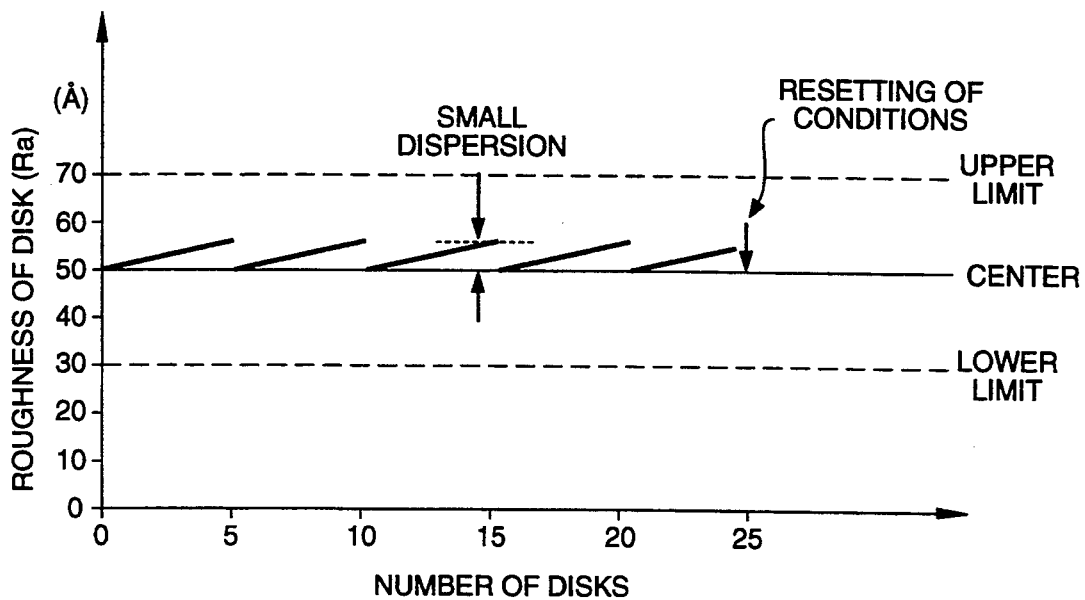
FIG._5

APPARATUS FOR TEXTURE PROCESSING OF MAGNETIC DISK

FIELD OF THE INVENTION

This invention relates to an apparatus for texture processing, by means of abrasive tape, the surface of a disk-shaped workpiece such as a magnetic disk; specifically, an apparatus whereby the roughness of the surface to be processed is measured for all workpieces, and the processing conditions are to be maintained at all times within a prescribed range.

BACKGROUND OF THE INVENTION

In texture processing in which a suitable roughness is given to the surface of a hard disk in a magnetic disk surface processing apparatus, the factors that affect the roughness include (1) processing pressure, (2) oscillation, (3) spindle rotation, (4) processing time, (5) rubber hardness, and (6) abrasive tape feed speed. Conventionally, these factors are each set to a fixed value initially, but trouble has been caused by discrepancies from the initial conditions due to such effects as changes in the temperature of the cooling fluid arising during processing, causing changes in the roughness of the disk surface, so that the prescribed roughness is no longer obtained.

What has conventionally been done to remedy such trouble is to measure the roughness of the disk surface every fixed number of processed disks, resetting the processing conditions once again as appropriate if the desired roughness is not attained. But this method leads to productivity problems, because the apparatus needs to be stopped while the roughness is measured and the appropriate processing conditions are reset.

For example, the time required to process a disk is given by the processing time−texture processing time+handling time; taking the processing time per disk to be 30 seconds and taking a batch to be 25 disks, the time needed to process one batch is 30 (seconds)×25=12.5 (minutes). It takes about 8 minutes to take out one disk from every 25 disks and measure its roughness on both sides at four spots by a contact method. Resetting the processing conditions from this measurement data and then restarting the apparatus takes 2 minutes, so in these circumstances the down time comes to 10 minutes.

Assuming an operation time per day to be 8 hours, we have 25 (disks)×60 (minutes)×8 divided by (12.5(minutes)+10 (minutes))=533 disks, for a treatment quantity of 21.3 batches. The number of disks measured is 21, and since these are tested destructively, they are discarded, so the actual production comes to 533−21=512 disks per day.

OBJECT OF THE INVENTION

The object of this invention is to provide an apparatus whereby, in regulating the roughness of the disk's surface in texture processing, the apparatus as a whole is not stopped, allowing this to be done without a decrease in productivity, while maintaining a high degree of uniformity in processing conditions.

SUMMARY OF THE INVENTION

In order to achieve the above object, this invention includes a roughness measurement apparatus that uses non-contact optical sensors to measure the surface roughness of all magnetic disks in the final processing step, and a processing equipment for judging the data obtained by the sensors and resetting the tape feed speed when the data departs from the desired processing conditions.

BRIEF DESCRIPTION OF THE DRAWINGS

FIG. 1 is a flowchart of the processing steps of an apparatus for processing the surface of a disk-shaped workpiece.

FIG. 2 is a side view of part of the photosensor measurement apparatus of this invention.

FIG. 3 is a block diagram showing the functions within the processing equipment.

FIG. 4 is a graph showing the disk surface processing conditions with the previous technology.

FIG. 5 is a graph showing the disk surface processing conditions with this invention.

DETAILED DESCRIPTION OF THE INVENTION

FIG. 1 is a flowchart showing the various steps in a general magnetic disk surface processing apparatus. Described concisely, first, a magnetic disk set onto a loader undergoes surface processing to a prescribed roughness in a texture processing step. Next, in a scrubbing step, the polishing residue produced in the preceding steps is removed, then washing is done in a showering step using pure water and a high-pressure showering step. In the next step, dry spinning, the disk is rotated at high speed to fling off any water droplets that adhere to the disk. Then the roughness of the disk's surface is measured, the disk is moved onto an unloading means, and it is transported out of the processing apparatus.

Factors that affect the surface roughness of a magnetic disk in texture processing by an apparatus of this type include variations in the processing pressure by which the abrasive tape is pressed against the magnetic disk, oscillation of the abrasive tape, the spindle rotation (i.e., the rotation of the magnetic disk), the abrasive tape feed speed, the processing time, and the hardness of the rubber rollers that press the abrasive tape against the magnetic disk. Therefore, the roughness of the surface of the magnetic disk can be regulated by controlling any of these factors.

Among these, changing the hardness of the rubber is one method that cannot be used, because it involves replacing the rubber rollers, which requires that the apparatus be stopped temporarily, thereby lowering productivity and making fine adjustments more difficult. Control by means of the processing pressure requires a complex mechanism, because adjustments must be made from inside, outside, to the left of, and to the right of the rubber rollers that apply the pressure, and oscillation and spindle rotation required to maintain uniformly; in addition, it is preferable not to alter the production plan concerning processing time, so none of these methods are suitable for use. Moreover, regulation of the roughness by such means of control is not very effective because, even if they are modified considerably, they affect the processing conditions less than does changing the feed speed of the abrasive tape.

Thus in the present invention it was decided that the surface roughness shall be regulated by adjustment of the feed speed of the abrasive tape, which has the greatest effect on the processing conditions and which is easy to control.

The present invention uses photosensors to measure the surface roughness of the disk. In the prior art, any magnetic disk used for measurement had to be thrown out, because it involved destructive testing by contact-type measurement. But in this invention, because photosensors are used, the measurement process causes no damage to the magnetic disk.

FIG. 2 is a side view of a part of a photosensor measurement apparatus embodying the invention, showing a sensor unit 1 and a disk holding unit 8. Measurement of the roughness of the surface of a disk 7 is done by the sensor unit 1. A pair of photosensors 2 attached separately to two vertically movable platforms 3; sensing parts of the sensors 2 go through arms 4 near their tips and are oriented so as to face each other. The two movable platforms 3 can be moved individually in the vertical direction. A microhead 6 is attached to each of these platforms 3 for fine adjustment of their heights. Each of the movable platforms 3 is attached to a horizontally movable platform 5 that can be moved back and forth in the longitudinal direction of the arm 4. The pair of movable platforms 3 is integrated and moves together in said longitudinal direction.

The disk 7 is held by a disk holding unit 8. The disk holding unit 8 is comprised of a pair of movable platforms 9 that can move perpendicularly to the longitudinal direction of the arm 4, two shafts 10 attached to each of said movable platforms, and rotating disk rotation V-rollers 11 that are provided at the end of the shafts 10.

A disk 7 that has been brought into the prescribed position within the measurement apparatus is held sandwiched between and by the V-rollers 11 of the pair of movable platforms 9 of the disk holding unit 8. It is held very stably because the edge of the disk 7 is held in valley portions of the V-rollers 11. Measurements are taken while the disk 7 is rotated at a speed of up to 50 (rpm) due to the rotation of said rollers.

Both sides of the disk are measured simultaneously by the pair of sensors 2 of the sensor unit 1. Measurement of the roughness of the disk surface is done by measuring the amount of reflection of the light that is irradiated on the surface. Any desired spot can be measured by moving the sensors in said longitudinal direction. Vertical adjustment by the microheads 6 can be done manually. It may also be done automatically by a control unit to be described below, together with other kinds of controls described above.

FIG. 3 is a block diagram showing the functions within the processing equipment for processing the values measured by the photosensors 2 and appropriately adjusting the tape feed speed.

Measurement data from the photosensors 2 go through a photosensor controller 21 and are fed to an analog-to-digital converter 22 as a 0–10 (v) DC output. A digitized signal is sent to a central processing unit (CPU) 23, and from there it is sent to and stored in a memory 24. The voltage is then displayed on a display 25. The voltage range corresponding to a prescribed range of surface processing conditions is shown on the display 25, making it possible to visually confirm that the surface processing is proceeding as desired if the voltage display of the measurement data is within the prescribed voltage range.

When the measurement data have been stored in the memory 24, an instruction to shift the sensor unit is sent from the CPU 23 via a motor controller 29 to a stepping motor 30 in order to change the position of measurement.

The CPU 23 judges, from the measurement data, whether the disk surface is in the prescribed desired processing condition, and if it is found not to be in this condition, it appropriately adjusts, via a controller 26 and a digital-to-analog converter 27, the rotation speed of a tape feed motor (now shown).

The above-described measurement and adjustment are done for each disk one by one, and because of this, the uniformity of processing conditions with the apparatus of this invention is decidedly better than that of the prior set.

FIG. 4 is a graph showing the state of disk surface processing using previous technology; the horizontal axis represents the number of disks, and the vertical axis represents the roughness of the surface. For the setting conditions, the upper limit of the allowable range is 70 angstroms, the lower limit is 30 angstroms, and the optimum value is 50 angstroms. As seen from the graph, the greater the number of disks processed, the farther the processing conditions depart from the optimum conditions, and when more than about 20 disks are processed, the upper limit is exceeded (similarly for the lower limit), creating the possibility of producing nonconforming article.

FIG. 5 is a graph showing the state of disk surface processing using this invention. The optimum processing is done with the first disk. For the second and subsequent disks, even if the same degree of departure from the optimum conditions occurs as with the previous technology, with this invention, any discrepancy is detected by measurement of the second disk and the processing conditions are immediately reset, so although the discrepancy increases after the second disk is processed and until the fifth disk is processed while measurements are being taken, before the sixth disk is processed, the processing conditions are reset, and with the sixth disk the optimum processing conditions are restored. As is clear from comparing FIG. 4 and FIG. 5, the statistical dispersion of processing conditions for the disk surface is much less with this invention than with the prior art.

EFFECTS OF THE INVENTION

As explained above, with this invention there is no possibility, barring accidents to the apparatus, of producing nonconforming article that deviate from the set processing conditions; moreover, the statistical dispersion of products within the allowable processing conditions is much less than with prior art, and products can be obtained whose processed surface accuracy is extremely stable.

In addition, this invention greatly improves productivity as compared with the prior art, because it is no longer necessary to stop the device when measuring the roughness.

Specifically, under the same conditions as the above example of the previous technology, operating the device of this invention for 8 hours processes 25 (disks)×60 (minutes)×8÷12.5 (minutes)=960 (disks). Since the measurement is done by non-contact measurement, there is no disk needs to dispose, and all 960 disks are produced. Compared with the 512 disks produced by the previous technology when operated for 8 hours as described above, this invention achieves a considerable 87.5% improvement in production.

What is claimed is:

1. In a texture-producing apparatus for producing texture on a surface of a disk by means of an abrasive tape, a roughness-regulating apparatus for regulating the roughness of a processed surface by adjusting the feed speed of said tape, said texture-producing apparatus comprising a measuring device for measuring the roughness of said processed surface and a processing device for processing data obtained by said measuring device and automatically adjusting the feed speed of said abrasive tape according to said data;

said measuring device comprising a sensor unit having a pair of photosensors attached to a movable stand so as to be able to simultaneously measure both surfaces of the disk and a holding unit for holding and rotating the disk while said disk is being measured;

said processing device comprising:

converting means for converting a measured amount of reflected light received thereby into a voltage value;

storing means for storing converted from analog form, comprising said data with preliminarily inputted data, and generating signals for adjusting the feed speed of said tape according to said digital data with respect to said preliminarily inputted data;

adjusting means for adjusting the rotational speed of said disk; and moving means for moving said photosensors;

said measuring device and said processing device being adapted to measure and process different disks sequentially.

2. The roughness-regulating apparatus of claim 1 wherein said storing means generates said signals for adjusting the feed speed of said tape if said digital data deviate from said preliminarily inputted data.

* * * * *